United States Patent
Kobayashi et al.

[11] Patent Number: 6,054,073
[45] Date of Patent: Apr. 25, 2000

[54] METHOD FOR PRODUCING INORGANIC SPHERICAL PARTICLES

[75] Inventors: Akira Kobayashi; Susumu Mizutani; Norihisa Nakashima, all of Omuta, Japan

[73] Assignee: Denki Kagaku Kogyo Kabushiki Kaisha, Chiyoda-ku, Japan

[21] Appl. No.: 09/138,567

[22] Filed: Aug. 24, 1998

[30] Foreign Application Priority Data

Aug. 25, 1997 [JP] Japan .................................. 9-228002

[51] Int. Cl.$^7$ ...................................................... B22D 11/01
[52] U.S. Cl. ...................................................... 264/15; 264/5
[58] Field of Search .......................................... 264/15, 5

[56] References Cited

U.S. PATENT DOCUMENTS 3,943,211  3/1976  Dickey et al. ........................... 264/15

FOREIGN PATENT DOCUMENTS

| 0 152 957 | 8/1985 | European Pat. Off. . |
| 33 38 888 | 5/1984 | Germany . |
| 62-241541 | 10/1987 | Japan . |
| 62-241542 | 10/1987 | Japan . |

OTHER PUBLICATIONS

Abstract of JP 36 2241541 A.

Abstract of JP 36 2241542 A.

Derwent Publications, 93–278009/35, JP 05 193911, Aug. 3, 1993.

Derwent Publications, 97–276588/25, JP 09 100105, Apr. 15, 1997.

*Primary Examiner*—James Derrington
*Attorney, Agent, or Firm*—Oblon, Spivak, McClelland, Maier & Neustadt, P.C.

[57] ABSTRACT

An apparatus for producing inorganic spherical particles by supplying raw material through a burner so as to pass through a flame and injecting it into a cooling tower, characterized in that the inner surface of the cooling tower is made of a metal.

9 Claims, 1 Drawing Sheet

METHOD FOR PRODUCING INORGANIC SPHERICAL PARTICLES

BACKGROUND OF THE INVENTION

1. Field of the Invention

The present invention relates to a method and an apparatus for producing inorganic spherical particles from inorganic raw material. Particularly, it relates to a method and an apparatus for producing inorganic spherical particles for a sealing material for semiconductors.

2. Discussion of Background

A filler to be used as a sealing material for semiconductors, is required to be free from inclusion of impurities and free from agglomeration or adhesion of particles and to have a stabilized surface condition. Heretofore, as a method for producing inorganic spherical particles such as spherical molten silica to be used as a sealing material for semiconductors, a technique has been proposed, as disclosed for example in JP-A-62-241541 and JP-62-241542, wherein an inorganic spherical powder material is injected together with a gas flame into a spheroidizing chamber and melted and spheroidized, and then rapidly cooled in the connected cooling chamber by a cooling gas blown thereto, to prevent fusion of particles. Namely, in the structure surrounding the flame, circumference of the burner constitutes a spheroidizing zone, and the inner wall is usually constituted by a heat insulating material or refractory. Further, a portion beyond the forward end of the flame constitutes the cooling zone.

However, such a conventional method has problems such that impurities are likely to be included due to damage of the refractory wall in the spheroidizing chamber or due to contact with the refractory wall, and convection of the gas flame is likely to take place in the spheroidizing chamber, whereby a powder is likely to deposit on the inner wall or the upper portion of the furnace, and if the powder deposition grows and the temperature rises, fused ten blocks are likely to form and cause clogging of the burner, scattering of raw material out of the flame, or clogging of the spheroidizing chamber and the cooling chamber, so that the operation can no longer be continued.

SUMMARY OF THE INVENTION

The present invention has been made in view of such problems, and it is an object of the present invention to provide an apparatus and a method, whereby spherical particles free from inclusion of impurities can be produced under a stabilized condition for a long period of time by suppressing formation of coarse particles. The present invention has been accomplished on the basis of a discovery that a spherical powder with little agglomeration or adhesion can be efficiently produced under a stabilized condition for a long period of time by employing a metal as the material of the structure inclusive of the circumference of the flame and making the entire structure as a cooling zone by carrying out cooling at the outer wall portion with a wetted wall or a water-cooling jacket. Accordingly, in the present invention, the entire structure surrounding the flame constitutes a cooling tower.

Further, it has been found possible to carry out the production under a stabilized condition by introducing a cooling gas to the cooling tower and permitting the cooling gas to flow along the flame so as to surround the flame, in order to carry out the cooling efficiently.

Furthermore, in order to carry out cooling after the spheroidizing effectively, the relation of the temperature distribution, the amount of gas and the size of the cooling zone in the cooling tower made of a metal, has been studied and as a result, it has been found that by adjusting the gas flow rate to a specific superficial velocity, or by adjusting the value of L/D of the cooling zone to a specific range, it is possible to carry out the production under a stabilized condition with little agglomeration or deposition on the wall. The present invention has been accomplished on the basis of these discoveries.

Here, in the present invention, the structure around a burner which used to be referred to as a furnace body, will be referred to as a cooling tower, as the inner surface of the structure is made of a metal having a high cooling effect, on the basis of the concept of carrying out the cooling positively.

Namely, the present invention provides an apparatus for producing inorganic spherical particles by supplying raw material through a burner so as to pass through a flame and injecting it into a cooling tower, characterized in that the inner surface of the cooling tower is made of a metal.

Further, the present invention provides such an apparatus wherein the ratio of the length L of the cooling tower to the circle-assimilated diameter D, i.e. L/D, is made to be from 2 to 5.

The present invention also provides a method for producing such inorganic spherical particles, wherein a cooling gas is introduced to surround the flame.

Further, the present invention provides such a method wherein the cooling gas is introduced between the flame and the wall of the cooling tower at an angle of at most 60° to the axis of the flame.

Still further, the present invention provides such a method wherein the superficial velocity of the gas in the cooling zone is adjusted to be from 0.04 to 3.00 m/sec.

DETAILED DESCRIPTION OF THE PREFERRED EMBODIMENTS

Figure 1:
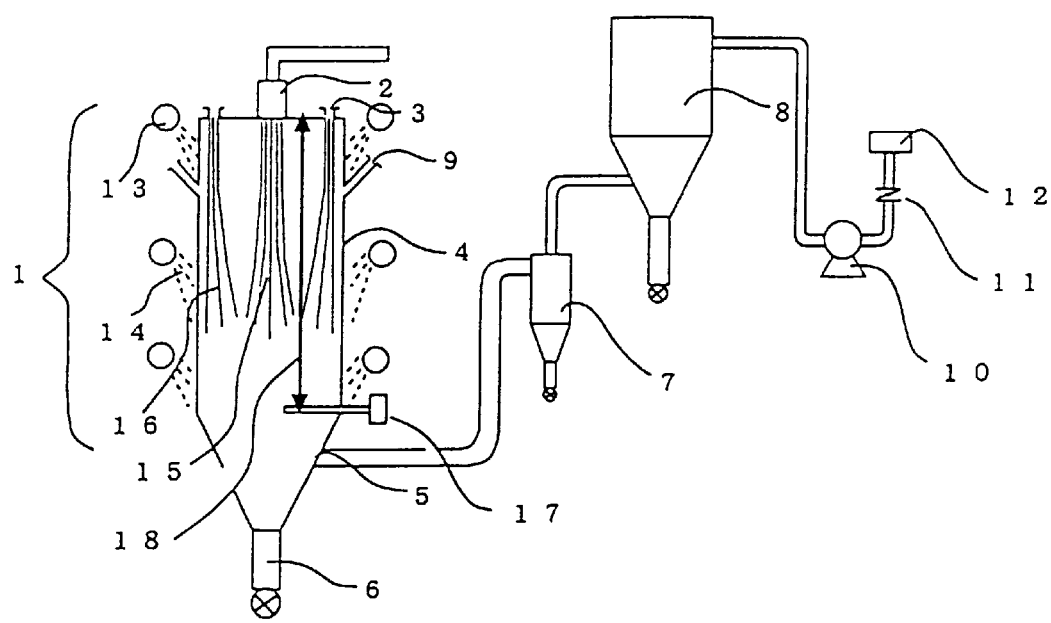
FIG. 1 is a view illustrating the construction of the apparatus for producing inorganic spherical particles.

Powder of inorganic raw material to be used in the present invention is not particularly limited so long as it is one which can be melted or softened by heating. However, the present invention is particularly suitable for inorganic raw material which is required to be spheroidized at a high temperature of at least 1800° C., such as silica raw material, alumina or a double oxide such as spinel or mullite. Particularly, silica raw material has a strong agglomerating nature after spheroidizing and is thus a material suitable for the method of the present invention. The particle size of the inorganic raw material may be from 0.5 to 200 μm. However, in general, as the particle size becomes fine at a level of at most 20 μm, agglomeration during cooling and deposition on the wall tends to increase, whereby the effects of the present invention will be substantial. However, the particle size is not particularly limited.

Now, the apparatus for producing spherical particles will be described with reference to FIG. 1.

The apparatus of the present invention employs a cooling tower made of a metal excellent in the cooling efficiency, which has no refractory lining of refractory material such as alumina bricks on the inner wall, and the exterior of the cooling tower is cooled with water or air. Particularly, a metal with good thermal conductivity is used as the material for a structure at the portion exposed to the highest temperature in a zone (flame zone) between the burner-installed portion to the forward end of the flame, so that cooling can positively be carried out. The cooling tower is preferably of a vertical type as shown in FIG. 1, whereby the temperature control of the cooling zone is easy. However, a so-called horizontal type or an inclined type may also be employed where the flame is blown in a horizontal direction, and spheroidizing is carried out while rotating a cooling tower. To protect a part of the sensor-attaching portion for e.g. measurement of the high temperature, with a heat insulating material or a refractory material, is within the scope of the present invention and is by no means restricted. In essence, the major portion of the inner surface of the cooling tower is made of a metal suitable for cooling. The cooling tower may be vertical, horizontal or inclined. The metal material constituting the wall surface is preferably a heat resistant steel such as hastelloy or stainless steel, and its surface is preferably made to have a surface roughness of not higher than 1S so that deposition of particles will be little.

The cooling tower surrounding the flame is made of a metal, whereby the cooling effect is high, and at the initial stage of operation, particles may deposit on the metal wall, but adhesion of the particles to one another is weak, and if deposited to some degree, the deposited particles will disintegrate at the interface of the deposited particles, whereby no bulky agglomerates will be formed, and no clogging of pipings will take place. Further, except for the initial stage, the metal surface is covered slightly with the deposited product, whereby corrosion hardly proceeds. Accordingly, inclusion of impurities due to a corrosion product of metal, can be prevented. Needless to say, there will be no inclusion of impurities due to damage of the refractory lining.

At this flame zone, cooling gas supply holes are arranged so that the cooling gas surrounds the flame and flows along the flame, whereby convection of the flame is prevented, collision of particles to one another will be minimized, spherical particles having excellent sphericity will be obtained without little adhesion of particles to one another, and the increase of deposition of particles on the wall surface will be suppressed and a constant operation will be possible.

As the cooling gas, it is usually most economical to employ air. However, a combustion exhaust gas, nitrogen gas or argon gas may be mixed thereto, as the case requires. To increase the cooling effect, the cooling gas components may be adjusted so that the moisture will increase, or water droplets will be included. In the case of a vertical type cooling tower as shown in FIG. 1, the cooling gas supply holes are formed on the ceiling which is the burner-installed surface, by providing a plurality of holes or slits along a circle with the burner located at the center. When the cooling gas supply holes are formed on the wall surface, they are provided preferably so that the cooling gas stream is introduced around the flame zone at an angle of at most 60° to the axis of the flame. The angle is preferably at most 45°, more preferably at most 30°, most preferably in parallel with the axis of the flame. If the cooling gas is introduced beyond 60°, a part of the flame undergoes convection or back flow, whereby collision of particles one another takes place vigorously, and particles tend to adhere to one another, thus leading to an increase of the particle size over the initial raw material. Further, deposition to the wall surface is likely to increase to form bulky substance. If the deposited substance becomes so thick, control of the temperature for control of the shape of the flame, tends to be difficult, and the operation will have to be stopped in a short period of time. The finer the powder, the higher such tendency.

Such cooling gas supply holes are required to be disposed on the burner side than the forward end of the flame in the longitudinal direction of the cooling tower, preferably by $\frac{2}{3}$, more preferably by $\frac{1}{2}$, of the length of the flame, on the burner side. Along the circumferential direction of the cooling tower, the supply holes are disposed so that the cooling gas flows along the inner wall of the cooling tower and it surrounds the flame without deviation. They may be disposed so that they are located outside of at least $\frac{1}{2}$ of the radius of the cooling tower, and their distances are set so that at least one hole exists within 30 cm, preferably at least one hole exists within 20 cm.

The cooling gas introduced from cooling gas inlets 1 installed on the burner-installed surface to surround the flame, serves to reduce the gas temperature in the cooling tower and to prevent convection of the combustion gas of the burner flame in the cooling tower, and it flows smoothly to the outlet direction and is discharged from the outlet of the cooling tower to the direction of a scavenger such as a bag filter. It is preferred to design so that the degree of opening of the inlets is adjustable to control the amount of the cooling gas introduced, whereby convection resulting from ascending of the combustion gas can be controlled. This cooling gas introduced, is effective also to reduce the wall temperature, whereby increase of deposition of the powder on the wall can be prevented.

Further, also in a case where the cooling gas is introduced from many holes on the wall surface of the cooling tower for cooling, it is necessary to adjust the angle of introduction to a level of at most 60°. If the cooling gas is introduced perpendicularly to the flame, it disturbs the flame directly, thus leading to an operation trouble.

The cooling zone in terms of the present invention is a portion corresponding to a basically straight barrel portion of the cooling tower ranging from the top of the cooling tower having the burner to a position where the inclination of the cone portion for primary recovery starts, as shown at 18 in FIG. 1. On the inner wall at this cooling zone, particles melted by the flame are likely to deposit. If this deposition layer is thick, the cooling ability of the cooling zone decreases. If the thickness of the deposition layer on the inner wall at the cooling zone, increases, the temperature of the surface of the deposition layer increases due to the decrease in the cooling ability of the cooling zone and shortening of the distance between the deposited powder and the flame. The deposited powder left at a high temperature for a long period of time undergoes sintering and solidification. The sintered and solidified deposition layer has irregularities on its surface, which further accelerates deposition. Repeating such deposition, sintering and solidification, the deposited layer continues to grow and leads to clogging of the interior of the cooling zone, or clogging of the transporting route of the power and inclusion of coarse particles, due to falling of the sintered and solidified powder by its own weight. If the deposition is little, the inner wall at the cooling zone is left to stand directly at a high temperature, and by an operation for a long period of time, the inner wall at the cooling zone tends to deteriorate to permit inclusion of foreign matters.

Thus, to operate spheroidizing by flame melting under a stabilized condition, it is essential to control the deposition layer on the inner wall of the cooling tower within a certain range.

In the present invention, in order to solve such a problem, the superficial velocity of the gas flowing in the cooling zone is adjusted to be from 0.04 to 3.00 m/sec, whereby control of the thickness of the deposition layer on the wall has been made possible, and a stabilized operation has been made possible.

In the present invention, the superficial velocity in the cooling zone is meant for the superficial velocity at the terminal end portion of the cooling zone. If this superficial velocity is less than 0.04 m/sec., a temperature difference will be created between the cooling zone initiating portion (upper portion) and the terminal end portion (lower portion), whereby it will be difficult to form a uniform deposition layer of particles on the wall of the cooling tower. In general, the deposition layer tends to be thick at the cooling zone initiating portion where the temperature is high, and deposition of the powder tends to be little at the terminal end portion of the cooling zone where the temperature is low.

On the other hand, if the superficial velocity exceeds 3.00 m/sec, increase of the deposition and sintering and solidification of the powder tend to be accelerated.

By adjusting the superficial velocity to a level of from 0.04 to 3.00 m/sec as suggested by the present invention, deposition on the wall can be stabilized, and a constant operation for a long period of time can be made possible. Preferably, the superficial velocity is from 1 to 2.5 m/sec.

Here, the superficial velocity is the velocity of the gas flowing at the terminal end portion of the cooling zone, which is calculated by the following formulas ① and ②.

Temperature correcting factor=(cooling zone outlet temperature+ 273)/273  ①

Superficial velocity (m/sec)=(amount of gas in the system (m³/h)× temperature correcting factor)/(cooling zone opening area (m²)×3600(sec/h))  ②

In the cooling zone, spheroidized particles will be subjected to cooling which starts from the forward end of the flame, and the temperature becomes lowest at the terminal end of the cooling zone. The superficial velocity becomes the maximum in the vicinity of the forward end of the flame and becomes the minimum at the terminal end of the cooling zone. Here, it is difficult to determine accurately the superficial velocity other than the terminal end of the cooling zone, since the temperature and the gas flow are not stabilized in the cooling process of the gas. With respect to the superficial velocity at the terminal end portion of the cooling zone after the gas is sufficiently cooled, a reliable value can be obtained. The temperature at this terminal end portion of the cooling zone is measured usually by a thermocouple thermometer, but other temperature measuring means may also be used. The amount of gas in the system can be calculated from the diameter of the pipe by means of the following formula after measuring the wind velocity and the temperature on the down stream side where the temperature is low, for example, on the outlet side of the suction blower for discharging the gas, simultaneously.

Amount of gas in the system (Nm³/h)=(wind velocity on the down stream side (m/sec)×opening area of the pipe at the measuring portion (m²)×273)/(the temperature on the down stream side (° C.)+273)

To measure the wind velocity and the temperature for calculation of the amount of gas in the system, it is preferred to employ a measuring apparatus serving as both a wind meter and a thermometer. Further, in a case where steam is contained in the gas to be measured, it is preferred to carry out the measurements at a portion of at least 100° C.

Further, the amount of suction air is represented by the difference between the amount of gas in the system and the amount of gas formed by combustion.

Amount of suction air (Nm³/H)=amount of gas in the system (Nm³/h)—amount of gas formed by combustion (Nm³/h)

Further, in the case of a complete combustion reaction of propane with oxygen, such a reaction is carried out in an oxygen excess state in many cases, and the amount of gas formed by combustion can be obtained from the amount of exhaust gas by theoretical combustion and the amount of excess oxygen. Control of the superficial velocity is carried out by controlling the amount of oxygen and the amount of the combustion gas and controlling the opening degree of the outlet valve or the rotational speed of the blower for a gas suction apparatus disposed at the rear end portion of the secondary recovery apparatus.

Further, the gas temperature at the terminal end portion of the cooling zone is preferably adjusted to a level of at least 400° C. The internal temperature at the terminal end portion of the cooling zone is represented by the value measured by a thermocouple inserted at the center in the direction of the diameter corresponding to a circle at the lower portion of the cooling zone, and the temperature at the outlet of the cooling zone can be controlled by the ratio of the combustion gas to the cooling gas introduced from the suction inlet, i.e. by the amount of combustion gas and the suction force of the gas suction apparatus.

In order to maintain the superficial velocity and the terminal end temperature of the cooling zone properly at the same time, not only the balance of the combustion gas and the cooling gas, but also the shape of the cooling zone is important. Namely, it is a cooling zone having a water-cooled wall, wherein the ratio of the length L of the cooling zone to the circle-assimilated diameter D, i.e. L/D, is from 2 to 5. If L/D is less than 2, the cooling effect tends to be inadequate, and the outlet temperature of the cooling zone tends to rise, and agglomeration of particles at the outlet portion tends to be remarkable. On the other hand, if L/D exceeds 5, the difference between the maximum temperature and the minimum temperature increases, and it becomes difficult to form uniform deposition, and particles tend to agglomerate at the high temperature portion, or deposition at the lower portion tends not to proceed at all. Preferably, L/D is from 3 to 4.

Now, an example in the case of silica will be described. The particle size of silica raw material is usually at most 200 $\mu$m with an average particle size of at most 40 $\mu$m, preferably at most 100 $\mu$m with an average particle size of at most 20 $\mu$m, more preferably at most 75 $\mu$m with an average particle size of at most 10 $\mu$m, although various types may be employed. Specially, raw material having an average particle size of at most 10 $\mu$m, is likely to scatter, and, in the absence of the cooling gas of the present invention, it may scatter out of the flame due to combustion of gas, melting tends to be incomplete, and it tends to deposit on the inner wall or the ceiling of the apparatus, whereby a continuous operation tends to be difficult. Besides, the temperature becomes unnecessarily high, whereby agglomerated particles are likely to form, and the powder characteristics will change. Accordingly, it is particularly effective to employ the apparatus and the method of the present invention for the production.

The combustion gas to form the flame may be a gas fuel such as a hydrocarbon gas such as acetylene, ethylene, propane, butane, LPG or LNG, or a liquid fuel such as kerosene oil or heavy oil. As a combustion-supporting gas, any one of oxygen, an oxygen rich cooling gas or air may be employed.

The raw material silica powder may be dispersed in either one or both of the combustion gas and the combustion-supporting gas, supplied into the combustion flame together with the gas from the burner inlet and heated for spheroidizing. The burner may be of an internal mixing or external mixing type so long as it has fuel ejecting holes so that the fuel can be supplied at a speed higher than a predetermined gas flow rate to prevent back fire.

Amorphous raw material particles injected together with the fuel or combustion-supporting gas from the forward end of the burner into the flame, will be heated in the flame and spheroidized with angular portions of particles rounded by melting, softening or evaporation. The size of the flame, the temperature of the flame and the residence time of the particles in the flame are substantially influential over the degree of spheroidizing, and they are required to be suitably controlled depending upon the melting point, vapor pressure and particle size of the raw material. If the flame temperature is high, the thickening rate increases. Therefore, the temperature is usually lower than 2000° C., preferably lower than 2000° C. and not lower than 1800° C., more preferably lower than 2000° C. and not lower than 1850° C. The particles after spheroidizing will be transported under cooling together with a gas mixture comprising the exhaust gas after combustion and the cooling gas supplied from the inlets. They will be collected by settlement by gravity, by an inertial dust separator such as a cyclone, or by a bag filter, during the transportation.

Here, the degree of fusion of the inorganic powder can be identified by the thickening rate of the particles represented by the ratio in the average particle size between the raw material particles and the fused particles. In a state where fusion of particles to one another is vigorous, the thickening rate of particles shows a large value, thus leading to formation of fused blocks, clogging in the system due to sintering of the powder deposited in the cooling tower, or deterioration in the sphericity due to re-fusion of the fused particles. In general, if the thickening rate of the particles exceeds 3, i.e. if the size of formed particles becomes more than three times as compared with the raw material particles, a constant operation tends to be hardly continued, and the sphericity tends to be poor, such being undesirable.

Now, the present invention will be described in further detail with reference to Examples. However, it should be understood that the present invention is by no means districted to such specific Examples.

EXAMPLE 1

A spheroidizing apparatus was prepared which comprised a cooling tower 4 of wet wall water-cooling type having water-spraying apparatus 13 therearound, a burner 2 which was capable of injecting a powder of inorganic raw material together with a flame to the center of the top of the cooling tower, and air inlets 3 located at the top of the cooling tower and air inlets 9 located at the barrel portion of the cooling tower, which were capable of introducing air at various angles to the axis of the flame. The cooling tower was of a vertical type with an inner diameter of 1.5 m and a length of 6 mm. To a wall surface of the cooling tower, no refractory lining was applied, and it was made of a metal of SUS316L.

At the lowest position of the water-cooling portion of the cooling zone (at the terminal end of the cooling zone), an apparatus 17 for measuring the temperature at the center of the cooling tower was provided.

While supplying to the burner 20 Nm$^3$/Hr of propane gas and 100 Nm$^3$/Hr of oxygen gas for combustion, 50 g/Hr of silica powder having an average particle size (Dr) 14 μm, was supplied. Simultaneously, blowers were operated, and the exhaust gas valve was adjusted so that air of 400 Nm$^3$/Hr can be introduced from sixteen air inlets 3 disposed equally on a circle at 1 m from the burner on the top of the cooling tower, and the operation was carried out. The air inlets 9 at the barrel portion of the cooling tower were closed not to permit air to enter therefrom. The superficial velocity at the terminal end portion of the cooling zone at that time, was calculated as described above, and was found to be 0.23 m/sec. From each of the lower portion 6 of the cooling tower, the cyclone 7 and the bag filter 8, fused particles for one hour, were collected, and they were mixed, whereupon the average particle size of the fused product (Df) was measured, and the thickening rate (Df/Dr) was calculated. The thickening rate was constant at a level of from 1.2 to 1.8 during the period of operation. Further, on the third day of the operation, the operation was once stopped, and the state of deposition of the particles on the inner wall of the cooling tower was inspected. As a result, the thickness of deposition of particles was from about 10 to 20 mm, and the deposited particles were readily disintegratable. Thereafter, the operation was further continued for 7 days, whereby spherical silica of constant quality was obtained without necessity to change the operational conditions.

EXAMPLE 2

The operation was carried out in the same manner as in Example 1 except that the air inlets 3 were closed, and sixteen air inlets 9 were disposed at a height of ½ of the length of the flame on the wall surface of the cooling tower, and the introduction angle was adjusted to 30° to the axis of the flame. The superficial velocity at the terminal end portion of the cooling zone was 0.23 m/sec. The deposition state of the particles on the wall surface was the same as in Example 1 except that the portion above the inlets 9 became slightly thicker. The thickening rate of the obtained spherical particles was from 1.7 to 1.9.

EXAMPLE 3

The operation was carried out in the same manner as in Example 2 except that the introduction angle of the air inlets 9 was changed to 90°. The superficial velocity at the terminal end portion of the cooling zone was 0.23 m/sec. The deposition state of particles on the wall surface upon expiration of 3 days after initiation of the operation was such that the deposition above the inlets 9, particularly at corner portions, was as thick as 40 mm. Further, the deposited material was agglomerates harder than in Example 2. The thickening rate of the obtained spherical particles was from 2.5 to 3.5.

EXAMPLE 4

The operation was carried out in the same manner as in Example 1 except that using a cooling tower having an internal diameter of 1 m and a length of 3 m, 3 Nm$^3$/Hr of propane gas, 15 Nm$^3$/Hr of oxygen gas and 10 kg/Hr of silica powder were supplied, and the amount of air introduced was 40 Nm$^3$/h. The superficial velocity at the terminal end portion of the cooling zone was 0.05 m/sec. Deposition of particles on the wall surface upon expiration of 3 days after initiation of the operation was from 10 to 20 mm, and the deposited material was readily removable. The thickening rate of the obtained spherical particles was from 1.2 to 1.6.

EXAMPLE 5

The operation was carried out in the same manner as in Example 1 except that using a cooling tower having an inner diameter of 1 m and a length of 1.5 m, 20 Nm³/Hr of propane gas, 100 Nm³/Hr of oxygen gas and 67 kg/Hr of silica powder were supplied, and the amount of air introduced was 1410 Nm³/Hr. The superficial velocity at the terminal end portion of the cooling zone was 2.46 m/sec. Deposition of particles on the wall surface upon expiration of 3 days after initiation of the operation was from 70 to 120 mm, and the deposited material was hard agglomerates. The thickening rate of the obtained spherical particles was from 1.8 to 2.4.

EXAMPLE 6

The operation was carried out in the same manner as in Example 1 except that using a cooling tower having an inner diameter of 1 m and a length of 6 m, 10 Nm³/Hr of propane gas, 50 Nm³/Hr of oxygen gas and 33 kg/Hr of silica powder were supplied, and the amount of air introduced was 250 Nm³/Hr. The superficial velocity at the terminal end portion of the cooling zone was 0.26 m/sec. Deposition of particles on the wall surface upon expiration of 3 days after initiation of the operation was from 10 to 20 mm, and the deposited material was readily removable. The thickening rate of the obtained spherical particles was from 1.7 to 2.2.

Comparative Example 1

The operation was carried out in the same manner as in Example 1 except that heat resistant castable was applied for 50 mm on the wall surface on the burner side than the forward end of the flame in the cooling tower. On the first day after initiation of the operation, hard blocks started to be included in the product obtainable from the lower portion of the cooling tower, and the operation was terminated, since foreign matters were observed among them. As a result of inspection of the interior of the cooling tower, deposition of hard particles of about 100 mm was observed at a portion corresponding to the height of the flame, and a part of such deposited particles was one fallen from the castable surface. The thickening rate of the spherical particles after removing blocks by sieving, was from 3.6 to 5.0.

Comparative Example 2

The operation was carried out in the same manner as in Comparative Example 1 except that the air inlets 3 at the top of the cooling tower were closed, and air inlets 9 at the barrel portion of the cooling tower were installed at a position 0.5 m below the forward end of the flame so that they became 90° to the axis of the flame. On 0.5 day after initiation of the operation, hard blocks started to be included in the product obtainable from the lower portion of the cooling tower, and the operation was terminated, since foreign matters were observed among them. As a result of inspection of the interior of the cooling tower, hard blocks of about 150 mm were deposited at a portion corresponding to the height of the flame, and a part thereof was fallen, and a part of the blocks was one fallen from the castable surface. Foreign matters which appear to be castable, were substantial, and therefore, the particle size was not measured.

Method for Measuring the Thickening Rate of Particles

The thickening rate of particles was determined by measuring the average particle size,(Dr50) of the raw material powder and the average particle size (Df50) of the fused powder, by a laser method, and obtaining (Df50/Dr50) from the measured values.

As described in the foregoing, by adopting the construction of the present invention, the following effects can be obtained.

① Deposition of powder on the wall is little, whereby the operation can be carried out under a stabilized condition for a long period of time.

② The cooling effect is promoted, and the heat load on the burner can be increased.

③ Back flow or convection of the flame can be prevented.

④ Adhesion of particles to one another is little, whereby spherical particles with little thickening of the particle size can be produced efficiently.

| Test No. Conditions, Results | | | Examples | | | | | | Comparative Examples | |
|---|---|---|---|---|---|---|---|---|---|---|
| | | | 1 | 2 | 3 | 4 | 5 | 6 | 1 | 2 |
| Cooling tower | Material of the inner surface of the cooling tower | | Metal | Metal | Metal | Metal | Metal | Metal | Castable | Castable |
| | Circle-assimilated diameter D(m) | | 1.5 | 1.5 | 1.5 | 1 | 1 | 1 | 1.5 | 1.5 |
| | Length L(m) | | 6 | 6 | 6 | 3 | 1.5 | 6 | 6 | 6 |
| | L/D | | 4 | 4 | 4 | 3 | 1.5 | 6 | 4 | 4 |
| Gas, raw material powder feeding conditions | Amount of LPG (Nm³/h) | | 20 | 20 | 20 | 3 | 20 | 10 | 20 | 20 |
| | Amount of O2 (Nm³/h) | | 100 | 100 | 100 | 15 | 100 | 50 | 100 | 100 |
| | Intro-duced air | Inlets No. | 3 | 9 | 9 | 3 | 3 | 3 | 3 | 9 |
| | | Angle (°) | — | 30 | 90 | — | — | — | — | 90 |
| | | Amount of air (Nm³/h) | 400 | 400 | 400 | 40 | 1410 | 250 | 400 | 400 |
| | Amount of raw material silica powder (kg/h) | | 50 | 50 | 50 | 10 | 67 | 33 | 50 | 50 |
| Temperature (° C.) at terminal end portion of the cooling zone | | | 480 | 472 | 451 | 421 | 951 | 365 | 791 | 782 |
| Amount of gas passed (Nm³/h) | | | 540 | 540 | 540 | 61 | 1550 | 320 | 540 | 540 |
| Superficial velocity at terminal end portion of the cooling zone (m/S) | | | 0.23 | 0.23 | 0.23 | 0.05 | 2.46 | 0.26 | 0.33 | 0.33 |
| Opera-tion state | Df/Dr | | 1.2–1.8 | 1.7–1.9 | 2.5–3.5 | 1.2–1.6 | 1.8–2.4 | 1.7–2.2 | 3.6–5.0 | — |
| | 1 day | Thickness | 10 | 10– | 10– | 10– | 30– | 10– | Castable | Castable |

-continued

| Test No. Conditions, Results | | Examples | | | | | | Comparative Examples | |
|---|---|---|---|---|---|---|---|---|---|
| | | 1 | 2 | 3 | 4 | 5 | 6 | 1 | 2 |
| after initiation of the operation | of deposit | mm | 20 mm | 40 mm | 20 mm | 50 mm | 20 mm | fallen | fallen |
| | State of deposit | Powder | Powder | Powder | Powder | Powder | Powder | | |
| | State of the inner wall surface | Normal | Normal | Normal | Normal | Normal | Normal | Operation terminated | Operation terminated |
| 3 days after initiation of the operation | Thickness of deposit | 10–20 mm | 20–30 mm | 20–40 mm | 10–20 mm | 70–100 mm | 10–20 mm | — | — |
| | State of deposit | Powder | Powder | Powder | Powder | Powder | Powder | — | — |
| | State of the inner wall surface | Normal | Normal | Normal | Normal | Normal | Normal | — | — |
| 7 days after initiation of the operation | Thickness of deposit | 20–30 mm | 20–40 mm | 30–60 mm | 20–30 mm | 70–120 mm | 10–20 mm | — | — |
| | State of deposit | Powder | Powder | Powder | Powder | Powder | Powder | — | — |
| | State of the inner wall surface | Normal | Normal | Normal | Normal | Normal | Normal | — | — |

What is claimed is:

1. A method for producing spherical inorganic particles, which comprises:

supplying a powdered raw material into a flame positioned in a cooling tower whose inner wall is made of a metal; and simultaneously introducing a cooling gas into the tower between the wall of the tower and the flame at an angle of not more than 60° to the axis of the flame, which establishes a cooling zone surrounding the flame in the tower, and such that the superficial velocity of the cooling gas at the terminal portion of the cooling zone ranges from 0.04–3.00 m/sec, thereby producing spherical particles from the raw material supplied to said flame.

2. The method of claim 1, wherein said powdered raw material is silica, alumina, mullite or spinel.

3. The method of claim 1, wherein the particle size of said powdered raw material ranges from 0.5–200 μm.

4. The method of claim 1, wherein said raw material is spheroidized at a temperature of at least 1800° C.

5. The method of claim 1, wherein said cooling gas is supplied into the cooling tower at a position about ⅔ of the length of the flame in the tower on the burner side of the tower.

6. The method of claim 1, wherein the temperature of the cooling gas at the terminal position of the cooling zone is at least 400° C.

7. The method of claim 1, wherein the cooling zone has a length L and a circle-assimilated diameter D where the ratio of the length L to the circle-assimilated diameter D ranges from 2–5.

8. The method of claim 7, wherein said ratio of L to D ranges from 3–4.

9. The method of claim 2, wherein said powdered raw material is powdered silica.

* * * * *